United States Patent
Wu

(10) Patent No.: US 8,770,737 B2
(45) Date of Patent: Jul. 8, 2014

(54) INK JET INKS CONTAINING NANODIAMOND BLACK COLORANTS

(71) Applicant: Xerox Corporation, Norwalk, CT (US)

(72) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 1 day.

(21) Appl. No.: 13/680,226

(22) Filed: Nov. 19, 2012

(65) Prior Publication Data

US 2013/0083134 A1    Apr. 4, 2013

Related U.S. Application Data

(62) Division of application No. 12/271,968, filed on Nov. 17, 2008, now Pat. No. 8,348,409.

(51) Int. Cl.
| | |
|---|---|
| *B41J 2/01* | (2006.01) |
| *B41J 2/21* | (2006.01) |
| *B41J 2/14* | (2006.01) |

(52) U.S. Cl.
CPC *B41J 2/2107* (2013.01); *B41J 2/01* (2013.01); *B41J 2/14201* (2013.01)
USPC .......................................... 347/100; 347/95

(58) Field of Classification Search
CPC ........ B41J 2/01; B41J 2/2107; B41J 2/14201; C09D 11/30; C09D 11/322; C09D 11/324
USPC ............. 347/95–100; 106/31.13, 31.27, 31.6; 523/160, 161
See application file for complete search history.

(56) References Cited

U.S. PATENT DOCUMENTS 5,506,295 A * 4/1996 Kado et al. .................... 524/548
5,916,955 A * 6/1999 Vereschagin et al. ......... 524/495

OTHER PUBLICATIONS

Yu-Chun Chen, "Diamond & Related Materials," Oct. 26, 2008, Elsevier, vol. 18 (2009), pp. 146-150.*

* cited by examiner

*Primary Examiner* — Matthew Luu
*Assistant Examiner* — Rut Patel
(74) *Attorney, Agent, or Firm* — Marylou J. Lavoie

(57) ABSTRACT

A liquid ink including (a) a carrier, (b) a colorant including nanodiamond black, and (c) a polymeric additive selected from the group including Gum Arabic, polyacrylate salts, polymethacrylate salts, polyvinyl alcohols, hydroxyl propylcellulose, hydroxyethylcellulose, polyvinylpyrrolidinone, polyvinyl ether, starch, polysaccharides, polyethylene imines derivatized with polyethylene oxide, polyethylene imines derivatized with polypropylene oxide, and mixtures thereof.

18 Claims, No Drawings

INK JET INKS CONTAINING NANODIAMOND BLACK COLORANTS

This application is a divisional of U.S. application Ser. No. 12/271,968 filed Nov. 17, 2008, U.S. Publication Number US-2010-0123746-A1, the disclosure of which is totally incorporated herein by reference.

RELATED CASES

U.S. Pat. No. 8,177,897, entitled "Phase Change Inks Containing Graphene-based Carbon Allotrope Colorants," with the named inventors James D. Mayo and Santokh Badesha, the disclosure of which is totally incorporated herein by reference, discloses, in embodiments, a phase change ink including a phase change ink carrier and a colorant comprising carbon nanotubes.

U.S. Ser. No. 12/272,347, entitled "Inks Including Carbon Nanotubes Dispersed in a Polymer Matrix," with the named inventors Valerie Farrugia, Yu Qi, Paul J. Gerroir, Rosa Duque, and Biritawit Asfaw, is totally incorporated herein by reference.

Copending Application U.S. Ser. No. 12/272,412, entitled "Toners Including Carbon Nanotubes Dispersed in a Polymer Matrix," with the named inventors Valerie Farrugia, Yu Qi, Paul J. Gerroir, Rosa Duque, Biritawit Asfaw, and Michael S. Hawkins, the disclosure of which is totally incorporated herein by reference, discloses, in embodiments, a toner comprising a resin comprising a polymerized mixture, optionally one or more colorants and optionally one or more waxes, wherein the polymerized mixture is a composite comprising carbon nanotubes and a polymer. In some embodiments, the polymer is a polyester, and the toner is an emulsion/aggregation toner.

BACKGROUND

Disclosed herein are inks and methods for the use thereof. One embodiment is directed to a hot melt or phase change ink comprising a phase change ink carrier and a colorant comprising nanodiamond black. Another embodiment is directed to an aqueous ink comprising an aqueous liquid vehicle and a colorant comprising nanodiamond black. Yet another embodiment is directed to a method which comprises (a) incorporating into an ink jet printing apparatus a phase change ink comprising a phase change ink carrier and a colorant comprising nanodiamond black; (b) melting the ink; (c) causing droplets of the melted ink to be ejected in an imagewise pattern onto the surface of the recording substrate, either directly or via an intermediate heated transfer belt or drum, where the droplets quickly solidify to form a predetermined pattern of solidified ink drops. Yet another embodiment is directed to a method which comprises (a) incorporating into an ink jet printing apparatus an aqueous ink comprising an aqueous liquid vehicle and a colorant comprising nanodiamond black; (b) causing droplets of the ink to be ejected in an imagewise pattern onto a substrate.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing. Phase change inks have also been used for applications such as postal marking, industrial marking, and labeling.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C. I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Aqueous inks generally comprise an aqueous liquid vehicle; a colorant; and optionally one or more additives. Examples of vehicles suitable for aqueous inks include water, glycols, mixtures of glycols, a mixture of water and a miscible organic component, such as a glycol, such as ethylene glycol, propylene glycol, diethylene glycols, glycerine, dipropylene glycol, polyethylene glycols, polypropylene glycols and the like, amides, ethers, carboxylic acids, esters, alcohols, organosulfides, organosulfoxides, sulfones, dimethylsulfoxide, sulfolane, alcohol derivatives, carbitol, butyl carbitol, cellosolve, ether derivatives, amino alcohols, ketones, and other water miscible materials, and mixtures thereof.

The use of dyes as colorants in solid or phase change ink compositions or aqueous inks results in brilliant colored images. However, certain soluble dyes can suffer from problems with thermal stability, light fastness, and dye migration. Further, custom syntheses required for certain dyes can make them expensive to produce. To overcome some of these issues, pigments can be selected as solid or phase change ink colorants or aqueous ink colorants. Pigmented inks have been successfully prepared and used in solid or phase change ink and aqueous ink printers. Pigments can provide inherent robustness, thermal stability and light fastness. Pigments can also reduce or eliminate the problem of dye migration in printed images, whereby the mobility of a dye colorant within the wax based image can result in a distortion or smearing of the image over time. Further, pigments are less expensive than dyes therefore providing a significant manufacturing cost advantage. However, incorporating pigmented inks into ink jet inks can be technically challenging and pigmented inks can be subject to jetting difficulties.

While known compositions and processes are suitable for their intended purposes, a need remains for improved aqueous and phase change ink compositions. In addition, there is a need for aqueous and phase change inks that enable improved thermal stability of the inks manifested as the color's stability over time when heated in printers. There is also a need for aqueous and phase change inks that enable improved printer reliability. In addition, a need remains for aqueous and phase change inks that exhibit excellent hiding power and enable obtaining the desired color or hue. Additionally, a need remains for aqueous and phase change inks having increased mechanical integrity. Further, a need remains for aqueous and phase change inks having improved mechanical integrity such as scratch and abrasion resistance. Even further, a need remains for aqueous and phase change inks having a low friction coefficient.

The appropriate components and process aspects of the each of the foregoing may be selected for the present disclosure in embodiments thereof.

SUMMARY

Disclosed herein is a phase change ink comprising (a) a phase change ink carrier and (b) a colorant comprising nanodiamond black. Further disclosed herein is an aqueous ink comprising (a) an aqueous liquid vehicle; and (b) a colorant comprising nanodiamond black. Also disclosed is a process which comprises (a) incorporating into an ink jet printing a phase change ink comprising (a) a phase change ink carrier and (b) a colorant comprising nanodiamond black; (b) melting the ink; (c) causing droplets of the melted ink to be ejected in an imagewise pattern onto the surface of the recording substrate, either directly or via an intermediate heated transfer belt or drum, where the droplets quickly solidify to form a predetermined pattern of solidified ink drops. Also disclosed is a method which comprises (a) incorporating into an ink jet printing apparatus an aqueous ink comprising an aqueous liquid vehicle and a colorant comprising nanodiamond black; (b) causing droplets of the ink to be ejected in an imagewise pattern onto a substrate.

DETAILED DESCRIPTION

The inks disclosed herein include an ink carrier and a nanodiamond black colorant. The inks herein can include aqueous inks and phase change or solid inks. Nanodiamond black can be readily dispersed in both aqueous and organic solvents. Nanodiamond black exhibits excellent mechanical, thermal and electrical properties. In addition to exceptional electrical, mechanical, and thermal characteristics, nanodiamond black also absorbs light very efficiently providing the present inks with excellent black color strength. Nanodiamond is a synthetic material and provides the advantage of being inexpensive to produce thereby providing the present inks with the advantages of improved properties and cost-effectiveness.

Nanodiamond is a diamond material comprising a tetrahedral $sp^3$ carbon diamond-like core and a fullerene $sp^2$ graphite shell substantially surrounding the core. In embodiments, the diameter of the nanodiamond crystal core is on average from about 1 to about 10 nanometers or about 5 nanometers, although not limited. In embodiments, the nanodiamond black B.E.T. surface area is from about 270 to about 380 $m^2$/gram, although not limited. In embodiments, the nanodiamond black has an average grain size of from about 5 to about 500 or from about 20 to about 50 nanometers. The unique morphology of nanodiamond black provides a core having diamond-like hardness and chemical inertia with a tunable graphite surface shell. The shell surface includes a spectrum of functional chemical groups including about 76 percent carbon, about 6 percent oxygen, and about 10 percent nitrogen, directly linked to the carbon core, rendering the nanodiamond electrically conductive. The nanodiamond is also thermally conductive. In addition, the unique rounded shape of the nanodiamond offers superior lubricity characteristics with the hardness and wear resistance of diamond.

The surface can be chemically tuned thus enabling selection of desired characteristics. For example, in embodiments, the nanodiamond colorants herein can be surface modified with groups such as, but not limited to, carboxyl, carbonyl, quinine, ether, alkyl, for example, methyl, nitrile, hydroxyl, lactone, amine, quaternized amine, and combinations thereof, among others. Surface modified nanodiamond black is more readily dispersed in aqueous inks or phase change inks than unmodified nanodiamond black since the functional groups tend to interact with the ink carriers and make the colorant more dispersible.

The core-shell nanodiamond black structure can comprise, in embodiments, a diamond core, present in an amount of from about 10 to about 70, or from about 30 to about 60, or from about 40 to about 50 weight percent with respect to the total weight of the core-shell structure. The core-shell nanodiamond black can further comprise the conductive shell comprised of graphite and modified graphite modified with groups such as —OH, —COOH, —NH$_2$ or quaternized amine, —CH$_3$ modified graphite, among others, as recited hereinabove, present in an amount of from about 30 to about 90, or from about 40 to about 70, or from about 50 to about 60 weight percent with respect to the total weight of the core-shell structure. In embodiments, the core-shell nanodiamond black comprises about 50 weight percent core and about 50 weight percent shell, with respect to the total weight percent of the core-shell structure.

Specific examples of nanodiamond black that can be selected for embodiments herein include NB50, commercially available from NanoBlox® Inc., Boca Raton, Fla., that possesses 50% of $sp^3$ carbon and 50% of $sp^2$ carbon ($sp^3$ diamond core and $sp^2$ graphite envelop, B.E.T. surface area about 460 $m^2$/g). Examples of surface modified nanodiamond blacks include NB50-OH, NB50-COOH, NB50-NH$_2$ or NB50-quaternerized amine, and NB50-CH$_3$, commercially available from NanoBlox® Inc., Boca Raton, Fla., including —OH, —COOH, —NH$_2$ or quaternized amine, and —CH$_3$ modified nanodiamond blacks, respectively.

Nanodiamond black may be obtained from commercial sources or synthesized by known methods. For example, U.S. Pat. No. 5,861,349, which is hereby incorporated by reference herein in its entirety, describes methods for making nanodiamond material by explosive synthesis in an oxygen depleted atmosphere, in embodiments comprising detonating in a closed space a charge consisting essentially of a carbon-containing explosive or mixture of explosives having a negative oxygen balance, the detonation being initiated in the presence of carbon particles in a concentration of about 0.01 to 0.15 kg/m$^3$ in a medium consisting essentially of about 0.1 to about 6 percent by volume oxygen and a balance of gases inert to carbon at a temperature of about 303 to about 363° K. Any suitable or desired explosive can be selected in embodiments, including, but not limited to, HMX (octogen, also known as high molecular weight RDX), trinitrotriamine benzene, RDX (cyclotrimethylenetrinitramine), mixtures of RDX and trotyl. See also, U.S. Pat. No. 5,916,955, which is hereby incorporated by reference herein in its entirety. In an alternate embodiment, nanodiamond black can be prepared by irradiation of graphite by high-energy laser pulses.

The nanodiamond black colorant is present in the aqueous or phase change ink in any desired or effective amount to obtain the desired color or hue, in one embodiment at least about 0.05 percent by weight on the ink, or in another embodiment at least about 0.1 percent by weight of the ink, and in another embodiment at least about 0.2 percent by weight of the ink, and in yet another embodiment at least about 0.5 percent by weight of the ink, and in one embodiment no more than about 50 percent by weight of the ink, and in another embodiment no more than about 20 percent by weight of the ink, and in another embodiment no more than about 30 percent by weight of the ink, and in yet another embodiment no more than about 10 percent by weight of the ink, although the amount can be outside of these ranges.

The aqueous ink or phase change ink can further include other black colorants such as carbon black, acetylene black, and Shawinigan black, present in an amount of from about 1 to about 40, or from about 4 to about 20 weight percent of the ink, although the amount can be outside of these ranges. Examples of carbon black include VULCAN® carbon blacks, REGAL® carbon blacks, and BLACK PEARLS® carbon blacks available from Cabot Corporation. Specific examples of black colorants include BLACK PEARLS® 1000 (B.E.T. surface area=343 m$^2$/g), BLACK PEARLS® 880 (B.E.T. surface area=240 m$^2$/g), BLACK PEARLS® 800 (B.E.T. surface area=230 m$^2$/g), BLACK PEARLS® L (B.E.T. surface area=138 m$^2$/g), BLACK PEARLS® 570 (B.E.T. surface area=110 m$^2$/g), BLACK PEARLS® 170 (B.E.T. surface area=35 m$^2$/g), VULCAN® XC72 (B.E.T. surface area=254 m$^2$/g), VULCAN® XC72R (fluffy form of VULCAN® XC72), VULCAN® XC605, VULCAN® XC305, REGAL® 660 (B.E.T. surface area=112 m$^2$/g), REGAL® 400 (B.E.T. surface area=96 m$^2$/g), and REGAL® 330 (B.E.T. surface area=94 m$^2$/g).

Any suitable ink carrier can be included in the phase change inks disclose herein. Suitable carrier components can include paraffins, microcrystalline waxes, polyethylene waxes, ester waxes, amides, fatty acids and other waxy materials, fatty amide containing materials, sulfonamide materials, resinous materials made from different natural sources (tall oil rosins and rosin esters, for example), and many synthetic resins, oligomers, polymers, and copolymers such as further discussed below.

Examples of suitable amides include, for example, monoamides, diamides, triamides, tetra-amides, cyclic amides and the like. Suitable triamides include, for example, those disclosed in U.S. Pat. No. 6,860,930, the entire disclosure of which is incorporated herein by reference. Suitable other amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and British Patent No. GB 2 238 792, the entire disclosures of each are incorporated herein by reference.

Other suitable carrier materials that can be used in the solid ink compositions include, for example, isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, and 6,309,453, British Patents Nos. GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the entire disclosures of each of which are incorporated herein by reference.

Further examples of suitable ink carrier materials include, for example, ethylene/propylene copolymers, such as those available from Baker Petrolite. Commercial examples of such copolymers include, for example, Petrolite CP-7 (Mn=650), Petrolite CP-11 (Mn=1,100, Petrolite CP-12 (Mn=1,200) and the like. The copolymers may have, for example, a melting point of from about 70° C. to about 150° C., such as from about 80° C. to about 130° C. or from about 90° C. to about 120° C. and a molecular weight range (Mn) of from about 500 to about 4,000.

Another type of ink carrier material may be n-paraffinic, branched paraffinic, and/or naphthenic hydrocarbons, typically with from about 5 to about 100, such as from about 20 to about 80 or from about 30 to about 60 carbon atoms, generally prepared by the refinement of naturally occurring hydrocarbons, such as BE SQUARE™ 185 and BE SQUARE™ 195, with molecular weights (Mn) of from about 100 to about 5,000, such as from about 250 to about 1,000 or from about 500 to about 800, for example such as available from Baker Petrolite.

Highly branched hydrocarbons, typically prepared by olefin polymerization, such as the VYBAR materials available from Baker Petrolite, including VYBAR™ 253 (Mn=520), VYBAR™ 5013 (Mn=420), and the like, may also be used. In addition, the ink carrier may be an ethoxylated alcohol, such as available from Baker Petrolite and of the general formula

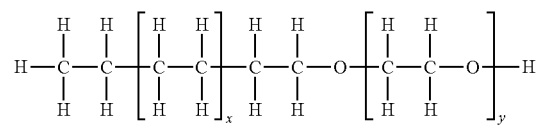

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX® 420 (Mn=560), UNITHOX® 450 (Mn=900), UNITHOX® 480 (Mn=2,250), UNITHOX®

520 (Mn=700), UNITHOX® 550 (Mn=1,100), UNITHOX® 720 (Mn=875), UNITHOX® 750 (Mn=1,400), and the like.

As an additional example, the ink carrier may be made of fatty amides, such as monoamides, tetra-amides, mixtures thereof, and the like, for example such as described in U.S. Pat. No. 6,858,070, which is hereby incorporated herein by reference in its entirety. Suitable monoamides may have a melting point of at least about 50° C., for example from about 50° C. to about 150° C., although the melting point can be outside these ranges. Specific examples of suitable monoamides include, for example, primary monoamides and secondary monoamides. Stearamide, such as KEMAMIDE® S available from Witco Chemical Company and CRODAMIDE® S available from Croda, behenamide/arachidamide, such as KEMAMIDE® B available from Witco and CRODAMIDE® BR available from Croda, oleamide, such as KEMAMIDE® U available from Witco and CRODAMIDE® OR available from Croda, technical grade oleamide, such as KEMAMIDE® O available from Witco, CRODAMIDE® O available from Croda, and UNISLIP® 1753 available from Uniqema, and erucamide such as KEMAMIDE® E available from Witco and CRODAMIDE® ER available from Croda, are some examples of suitable primary amides. Behenyl behenamide, such as KEMAMIDE® EX666 available from Witco, stearyl stearamide, such as KEMAMIDE® S-180 and KEMAMIDE® EX-672 available from Witco, stearyl erucamide, such as KEMAMIDE® E-180 available from Witco and CRODAMIDE® 212 available from Croda, erucyl erucamide, such as KEMAMIDE® E-221 available from Witco, oleyl palmitamide, such as KEMAMIDE® P-181 available from Witco and CRODAMIDE® 203 available from Croda, and erucyl stearamide, such as KEMAMIDE® S-221 available from Witco, are some examples of suitable secondary amides. Additional suitable amide materials include KEMAMIDE® W40 (N,N'-ethylenebisstearamide), KEMAMIDE® P181 (oleyl palmitamide), KEMAMIDE® W45 (N,N'-thylenebisstearamide), and KEMAMIDE® W20 (N,N'-ethylenebisoleamide).

Further optional components can include high molecular weight linear alcohols, such as those available from Baker Petrolite and of the general formula

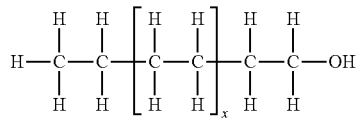

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN® materials such as UNILIN® 425 (Mn=460), UNILIN® 550 (Mn=550), UNILIN® 700 (Mn=700), and distilled alcohols, the viscosity of which at the jetting temperature in one embodiment can be from about 5 to about 50% higher than the non-distilled alcohol.

Further examples include hydrocarbon-based waxes, such as the homopolymers of polyethylene available from Baker Petrolite and of the general formula

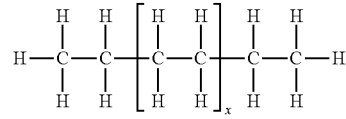

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include PW400 (Mn about 400), distilled PW400, in one embodiment having a viscosity of about 10% to about 100% higher than the viscosity of the undistilled POLYWAX® 400 at about 110° C., POLYWAX 500 (Mn about 500), distilled POLYWAX® 500, in one embodiment having a viscosity of about 10% to about 100% higher than the viscosity of the undistilled POLYWAX® 500 at about 110° C., POLYWAX 655 (Mn about 655), distilled POLYWAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C. POLYWAX 850 (Mn about 850), POLYWAX 1000 (Mn about 1,000), and the like.

Further examples include modified maleic anhydride hydrocarbon adducts of polyolefins prepared by graft copolymerization, such as those available from Baker Petrolite and of the general formulas

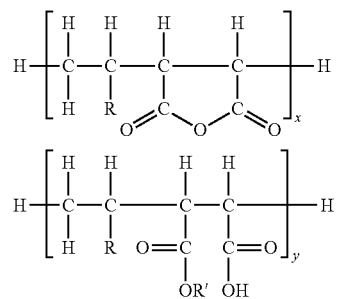

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; and those available from Baker Petrolite and of the general formula

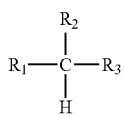

wherein $R_1$ and $R_3$ are hydrocarbon groups and $R_2$ is either of one of the general formulas

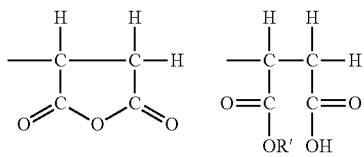

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER® 67 (Mn=655, Mw/Mn=1.1), CERAMER® 1608 (Mn=700, Mw/Mn=1.7), and the like.

Additional examples of suitable ink vehicles for the phase change inks include rosin esters; polyamides; dimer acid amides; fatty acid amides, including ARAMID® C; epoxy resins, such as EPOTUF® 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX® MH and KETJENFLEX® MS80; benzoate esters, such as BENZOFLEX® 5552, available from Velsicol Chemical Company; phthalate plasticizers; citrate plasticizers; maleate plasticizers; sulfones, such as diphenyl sulfone, n-decyl sulfone, n-arnyl sulfone, chlorophenyl methyl sulfone; polyvinyl pyrrolidinone copolymers; polyvinyl pyrrolidone/polyvinyl acetate copolymers; novolac resins, such as DUREZ® 12 686, available from Occidental Chemical Company; and natural product waxes, such as beeswax, monton wax, candelilla wax, GILSONITE® (American Gilsonite Company), and the like; mixtures of linear primary alcohols with linear long chain amides or fatty acid amides, such as those with from about 6 to about 24 carbon atoms, including PARICIN® 9 (propylene glycol monohydroxystearate), PARICIN® 13 (glycerol monohydroxystearate), PARICIN® 15 (ethylene glycol monohydroxystearate), PARICIN® 220 (N(2-hydroxyethyl)-12-hydroxystearamide), PARICIN® 285 (N,N'-ethylene-bis-12-hydroxystearamide), FLEXRICIN® 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In addition, the ink vehicles described in U.S. Pat. No. 6,906,118, which is incorporated herein by reference in its entirety, may also be used. The ink vehicle may contain a branched triamide such as those described in U.S. Pat. No. 6,860,930, the disclosure of which is also incorporated by reference herein in its entirety,

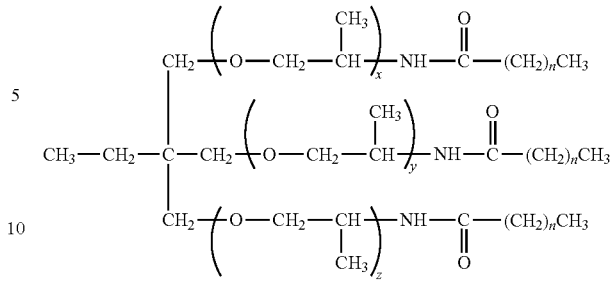

wherein n has an average value of from about 34 equal to or less than 40, where x, y and z can each be zero or an integer, and wherein the sum of x, y, and z is from about 5 and equal to or less than 6.

Examples of vehicles suitable for aqueous inks include water, glycols, mixtures of glycols, a mixture of water and a miscible organic component, such as a glycol, such as ethylene glycol, propylene glycol, diethylene glycols, glycerin, dipropylene glycol, polyethylene glycols, polypropylene glycols and the like, amides, ethers, carboxylic acids, esters, alcohols, organosulfides, organosulfoxides, sulfones, dimethyl sulfoxide, sulfolane, alcohol derivatives, carbitol, butyl carbitol, cellosolve, ether derivatives, amino alcohols, ketones, and other water miscible materials, and mixtures thereof.

In embodiments, the phase change inks herein can comprise radiation curable inks generally comprising at least one curable monomer, a colorant, and a radiation activated initiator, specifically a photoinitiator, that initiates polymerization of curable components of the ink, specifically of the curable monomer. In specific embodiments, the ink vehicles disclosed herein can comprise any suitable curable monomer or prepolymer. Examples of suitable materials include radically curable monomer compounds, such as acrylate and methacrylate monomer compounds, which are suitable for use as phase change ink carriers. Specific examples of relatively nonpolar acrylate and methacrylate monomers include (but are not limited to) isobornyl acrylate, isobornyl methacrylate, lauryl acrylate, lauryl methacrylate, isodecylacrylate, isodecylmethacrylate, caprolactone acrylate, 2-phenoxyethyl acrylate, isooctylacrylate, isooctylmethacrylate, butyl acrylate, and the like, as well as mixtures and combinations thereof. In addition, multifunctional acrylate and methacrylate monomers and oligomers can be included in the phase change ink carrier as reactive diluents and as materials that can increase the crosslink density of the cured image, thereby enhancing the toughness of the cured images. Examples of suitable multifunctional acrylate and methacrylate monomers and oligomers include (but are not limited to) pentaerythritol tetraacrylate, pentaerythritol tetramethacrylate, 1,2-ethylene glycol diacrylate, 1,2-ethylene glycol dimethacrylate, 1,6-hexanediol diacrylate, 1,6-hexanediol dimethacrylate, 1,12-dodecanol diacrylate, 1,12-dodecanol dimethacrylate, tris(2-hydroxy ethyl) isocyanurate triacrylate, propoxylated neopentyl glycol diacrylate (available from Sartomer Co. Inc. as SR 9003), hexanediol diacrylate, tripropylene glycol diacrylate, dipropylene glycol diacrylate, amine modified polyether acrylates (available as PO 83 F, LR 8869, and/or LR 8889 (all available from BASF Corporation), trimethylolpropane triacrylate, glycerol propoxylate triacrylate, dipentaerythritol pentaacrylate, dipentaerythritol hexaacrylate, ethoxylated pentaerythritol tetraacrylate (available from Sartomer Co. Inc. as SR 494), and the like, as well as mixtures and combinations thereof. When a reactive diluent is added to the ink carrier material, the reactive diluent is added in any desired or effective amount, in one embodiment at least about 1 percent by weight of the carrier, and in another embodiment at least about 35 percent by weight of the carrier, and in one embodiment no more than about 80 percent by weight of the carrier, and in another embodiment no more than about 70 percent by weight of the carrier, although the amount of diluent can be outside of these ranges.

In embodiments, the ink vehicles contain at least one compound that can exhibit gel-like behavior in that it undergoes a relatively sharp increase in viscosity over a relatively narrow temperature range when dissolved in a liquid such as those compounds that behave as curable monomers when exposed to radiation such as ultraviolet light. One example of such a liquid curable monomer is a propoxylated neopentyl glycol diacrylate such as SR9003, commercially available from Sartomer Co. Inc.

In one embodiment, some compounds as disclosed herein undergo a change in viscosity of at least about $10^3$ centipoise, in another embodiment at least about $10^5$ centipoise, and in yet another embodiment at least about $10^6$ centipoise over a temperature range of in one embodiment at least about 30° C., in another embodiment at least about 10° C., and in yet another embodiment at least about 5° C., although the viscosity change and temperature range can be outside of these ranges, and compounds that do not undergo changes within these ranges are also included herein.

At least some embodiments of the compounds disclosed herein can form a semi-solid gel at a first temperature. For example, when the compound is incorporated into a phase change ink, this temperature is below the specific temperature at which the ink is jetted. The semi-solid gel phase is a physical gel that exists as a dynamic equilibrium comprising one or more solid gellant molecules and a liquid solvent. The semi-solid gel phase is a dynamic networked assembly of molecular components held together by non-covalent interactions such as hydrogen bonding, Van der Waals interactions, aromatic non-bonding interactions, ionic or coordination bonding, London dispersion forces, or the like, which, upon stimulation by physical forces, such as temperature, mechanical agitation, or the like, or chemical forces, such as pH, ionic strength, or the like, can undergo reversible transitions from liquid to semi-solid state at the macroscopic level. The solutions containing the gellant molecules exhibit a thermally reversible transition between the semi-solid gel state and the liquid state when the temperature is varied above or below the gel point of the solution. This reversible cycle of transitioning between semi-solid gel phase and liquid phase can be repeated many times in the solution formulation.

In specific embodiments, the ink vehicles disclosed herein can comprise any suitable photoinitiator. Examples of specific initiators include, but are not limited to, Irgacure® 127, Irgacure® 379, Irgacure® 819, all commercially available from Ciba Specialty Chemicals, among others. Further examples of suitable initiators include (but are not limited to) benzophenones, benzophenone derivatives, isopropyl thioxanthenones, arylsulphonium salts, aryl iodonium salts, benzyl ketones, monomeric hydroxyl ketones, polymeric hydroxyl ketones, α-amino ketones, acyl phosphine oxides, metallocenes, benzoin ethers, benzil ketals, α-hydroxyalkylphenones, α-aminoalkylphenones, acyl phosphine oxides, acylphosphine photoinitiators sold under the trade designations of IRGACURE® and DAROCUR® from Ciba, and the like. Specific examples include 1-hydroxy-cyclohexylphenylketone, benzophenone, 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phosphine oxide, phenyl bis(2,4,6-trimethylbenzoyl) phosphine oxide, benzyl-dimethylketal, isopropylthioxanthone, 2,4,6-trimethylbenzoyldiphenylphosphine oxide (available as BASF LUCIRIN® TPO), 2,4,6-trimethylbenzoylethoxyphenylphosphine oxide (available as BASF LUCIRIN® TPO-L), bis(2,4,6-trimethylbenzoyl)-phenyl-phosphine oxide (available as Ciba IRGACURE® 819) and other acyl phosphines, 2-methyl-1-(4-methylthio)phenyl-2-(4-morphorlinyl)-1-propanone (available as Ciba IRGACURE® 907) and 1-(4-(2-hydroxyethoxy)phenyl)-2-hydroxy-2-methylpropan-1-one (available as Ciba IRGACURE® 2959), 2-benzyl 2-dimethylamino 1-(4-morpholinophenyl) butanone-1 (available as Ciba IRGACURE® 369), 2-hydroxy-1-(4-(4-(2-hydroxy-2-methylpropionyl)-benzyl)-phenyl)-2-methylpropan-1-one (available as Ciba IRGACURE® 127), 2-dimethylamino-2-(4-methylbenzyl)-1-(4-morpholin-4-ylphenyl)-butanone (available as Ciba IRGACURE® 379), titanocenes, isopropylthioxanthone, 1-hydroxy-cyclohexylphenylketone, benzophenone, 2,4,6-trimethylbenzophenone, 4-methylbenzophenone, diphenyl-(2,4,6-trimethylbenzoyl) phosphine oxide, 2,4,6-trimethylbenzoylphenylphosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, and the like, as well as mixtures thereof.

Optionally, the phase change inks can also contain an amine synergist, which are co-initiators which can donate a hydrogen atom to a photoinitiator and thereby form a radical species that initiates polymerization, and can also consume dissolved oxygen, which inhibits free-radical polymerization, thereby increasing the speed of polymerization. Examples of suitable amine synergists include (but are not limited to) ethyl-4-dimethylaminobenzoate, 2-ethylhexyl-4-dimethylaminobenzoate, and the like, as well as mixtures thereof.

Initiators for inks disclosed herein can absorb radiation at any desired or effective wavelength, in one embodiment at least about 200 nanometers, and in one embodiment no more than about 560 nanometers, and in another embodiment no more than about 420 nanometers, although the wavelength can be outside of these ranges.

Optionally, the photoinitiator is present in the phase change ink in any desired or effective amount, in one embodiment at least about 0.5 percent by weight of the ink composition, and in another embodiment at least about 1 percent by weight of the ink composition, and in one embodiment no more than about 15 percent by weight of the ink composition, and in another embodiment no more than about 10 percent by weight of the ink composition, although the amount can be outside of these ranges.

Any suitable reactive wax can be used for the phase change in vehicles disclosed herein. In embodiments, the reactive wax comprises a curable wax component that is miscible with the other components and that will polymerize with the curable monomer to form a polymer. Inclusion of the wax promotes an increase in viscosity of the ink as it cools from the jetting temperature.

In embodiments, the reactive wax is a hydroxyl-terminated polyethylene wax functionalized with a polymerizable group. Suitable examples of waxes include, but are not limited to, those that are functionalized with curable groups. The curable groups may include, but are not limited to, acrylate, methacrylate, alkene, allylic ether, epoxide and oxetane. These waxes can be synthesized by the reaction of a wax equipped with a transformable functional group, such as carboxylic acid or hydroxyl.

Suitable examples of hydroxyl-terminated polyethylene waxes that may be functionalized with a curable group include, but are not limited to, mixtures of carbon chains with the structure $CH_3—(CH_2)_n—CH_2OH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNILIN® 350, UNILIN® 425, UNILIN® 550 and UNILIN® 700 with Mn approximately equal to 375, 460, 550 and 700 g/mol, respectively. All of these waxes are commercially available from Baker-Petrolite. Guerbet alcohols, characterized as 2,2-dialkyl-1-ethanols, are also suitable compounds. Specific embodiments of Guerbet alcohols include those containing 16 to 36 carbons, many of which are commercially available from Jarchem Industries Inc., Newark, N.J. In embodiments, PRIPOL® 2033 is selected, PRIPOL® 2033 being a C-36 dimer diol mixture including isomers of the formula

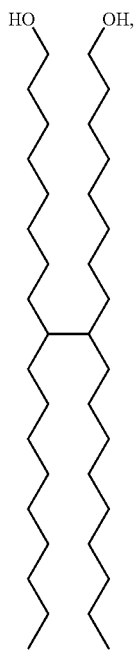 [SMILES: CCCCCCCCCC(CCCCCCCCO)C(CCCCCCCCC)CCCCCCCCO]

as well as other branched isomers which may include unsaturations and cyclic groups, available from Uniqema, New Castle, Del. Further information on C36 dimer diols of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference. These alcohols can be reacted with carboxylic acids equipped with UV curable moieties to form reactive esters. Examples of these acids include, but are not limited to, acrylic and methacrylic acids, available from Sigma-Aldrich Co. Specific curable monomers include acrylates of UNILIN® 350, UNILIN® 425, UNILIN® 550 and UNILIN® 700.

Suitable examples of carboxylic acid-terminated polyethylene waxes that may be functionalized with a curable group include, but are not limited to, mixtures of carbon chains with the structure $CH_3—(CH_2)_n—COOH$, where there is a mixture of chain lengths, n, where the average chain length is in selected embodiments in the range of about 16 to about 50, and linear low molecular weight polyethylene, of similar average chain length. Suitable examples of such waxes include, but are not limited to, UNICID® 350, UNICID® 425, UNICID® 550 and UNICID® 700 with Mn equal to approximately 390, 475, 565 and 720 g/mol, respectively. Other suitable waxes have a structure $CH_3—(CH_2)_n—COOH$, such as hexadecanoic or palmitic acid with n=14, heptadecanoic or margaric or daturic acid with n=15, octadecanoic or stearic acid with n=16, eicosanoic or arachidic acid with n=18, docosanoic or behenic acid with n=20, tetracosanoic or lignoceric acid with n=22, hexacosanoic or cerotic acid with n=24, heptacosanoic or carboceric acid with n=25, octacosanoic or montanic acid with n=26, triacontanoic or melissic acid with n=28, dotriacontanoic or lacceroic acid with n=30, tritriacontanoic or ceromelissic or psyllic acid, with n=31, tetratriacontanoic or geddic acid with n=32, pentatriacontanoic or ceroplastic acid with n=33. Guerbet acids, characterized as 2,2-dialkyl ethanoic acids, are also suitable compounds. Selected Guerbet acids include those containing 16 to 36 carbons, many of which are commercially available from Jarchem Industries Inc., Newark, N.J. PRIPOL® 1009 (C-36 dimer acid mixture including isomers of the formula

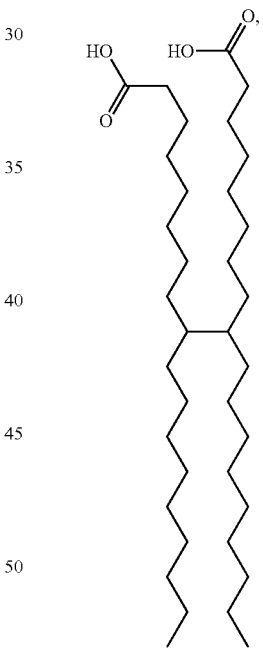

as well as other branched isomers which may include unsaturations and cyclic groups, available from Uniqema, New Castle, Del.; further information on C36 dimer acids of this type is disclosed in, for example, "Dimer Acids," Kirk-Othmer Encyclopedia of Chemical Technology, Vol. 8, 4th Ed. (1992), pp. 223 to 237, the disclosure of which is totally incorporated herein by reference) can also be used. These carboxylic acids can be reacted with alcohols equipped with UV curable moieties to form reactive esters. Examples of these alcohols include, but are not limited to, 2-allyloxyethanol from Sigma-Aldrich Co.;

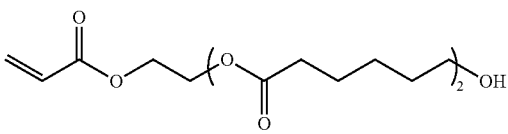

SR495B from Sartomer Company, Inc.;

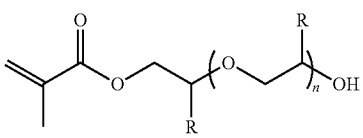

CD572 (R=H, n=10) and SR604 (R=Me, n=4) from Sartomer Company, Inc.

Also suitable are polyethylene waxes, such as those available from Baker Petrolite as POLYWAX® 500 and the like, distilled to remove about 15 percent of the lower molecular weight fraction and about 15 percent of the upper molecular weight fraction, Mp=582, Mn=562, Mw=579, MWD=1.03 as measured by HT-GPC, as disclosed in, for example, U.S. Pat. No. 7,381,254, the disclosure of which is totally incorporated herein by reference.

In embodiments, the optional curable wax is included in the ink in an amount of from, for example, about 1 to about 25% by weight of the ink, or from about 2 to about 20% by weight of the ink, or from about 2.5 to about 15% by weight of the ink, although the amounts can be outside of these ranges.

The curable monomer or prepolymer and curable wax together can form more than about 50% by weight of the ink, or at least 70% by weight of the ink, or at least 80% by weight of the ink, although not limited.

Any suitable gellant can be used for the ink vehicles disclosed herein. In embodiments, a gellant such as described in U. S. patent application Ser. No. 11/290,202, filed Nov. 30, 2005, entitled "Phase Change Inks Containing Photoinitiator With Phase Change Properties and Gellant Affinity," with the named inventors Peter G. Odell, Eniko Toma, and Jennifer L. Belelie, the disclosure of which is totally incorporated herein by reference. In embodiments, gellants herein can comprise materials disclosed in copending U.S. application Ser. No. 11/290,121, filed Nov. 30, 2005, entitled "Phase Change Inks Containing Curable Amide Gellant Compounds," with the named inventors Eniko Toma, Jennifer L. Belelie, and Peter G. Odell, the disclosure of which is totally incorporated herein by reference. The gellant compounds as disclosed herein can be prepared by any desired or effective method. For example, in embodiments, gellants can be prepared as described in U.S. Pat. No. 7,259,275, entitled "Method for Preparing Curable Amide Gellant Compounds," with the named inventors Jennifer L. Belelie, Adela Goredema, Peter G. Odell, and Eniko Toma, and the disclosure of which is totally incorporated herein by reference.

Embodiments herein further include inks with gellants (that is, non-curable inks with gellants). See, for example, U.S. Pat. Nos. 6,906,118, 6,761,758, 6,811,595, 6,860,928, 6,872,243, 6,835,833, 7,087,752, 7,314,949, 7,144,450, and 7,220,300, each of which is totally incorporated by reference herein.

For radiation curable embodiments, curing of the ink can be effected by exposure of the ink image to actinic radiation at any desired or effective wavelength, in one embodiment at least about 200 nanometers, and one embodiment no more than about 480 nanometers, although the wavelength can be outside of these ranges. Exposure to actinic radiation can be for any desired or effective period of time, in one embodiment for at least about 0.2 second, in another embodiment for at least about 1 second, and in yet another embodiment for at least about 5 seconds, and in one embodiment for no more than about 30 seconds, and in another embodiment for no more than about 15 seconds, although the exposure period can be outside of these ranges. By curing is meant that the curable compounds in the ink undergo an increase in molecular weight upon exposure to actinic radiation, such as (but not limited to) crosslinking, chain lengthening, or the like.

Various optional additives can be employed, as suitable and desired, in embodiments herein. For example, a plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the ink carrier. The plasticizer is present in the ink carrier in any desired or effective amount, in one embodiment of at least about 0.05% by weight of the ink carrier, in another embodiment of at least about 1% by weight of the ink carrier, and in yet another embodiment of at least about 2% by weight of the ink carrier, and in one embodiment of equal to or less than about 15% by weight of the ink carrier, in another embodiment of equal to or less than about 10% by weight of the ink carrier, and in yet another embodiment of equal to or less than about 5% by weight of the ink carrier, although the amount can be outside of these ranges. Examples of suitable plasticizers include SANTICIZER® 278, SANTICIZER® 154, SANTICIZER®160, SANTICIZER® 261 (commercially available from Monsanto), and the like or mixtures thereof.

The inks can also optionally contain an antioxidant. The optional antioxidants of the ink compositions protect the images from oxidation and also protect the ink components from oxidation during the heating portion of the ink preparation process.

In embodiments, a hindered amine antioxidant can be present in the ink in any desired or effective amount, in one embodiment of at least about 0.001 percent by weight of the ink carrier, in another embodiment of at least about 0.05 percent by weight of the ink carrier, and in yet another embodiment of at least about 0.10 percent by weight of the ink carrier, and in one embodiment of equal to or less than about 0.50 percent by weight of the ink carrier, in another embodiment of equal to or less than about 0.25 percent by weight of the ink carrier, and in yet another embodiment of equal to or less than about 0.15 percent by weight of the ink carrier, although the amount can be outside of these ranges.

Examples of suitable hindered amine antioxidants include those of general formula

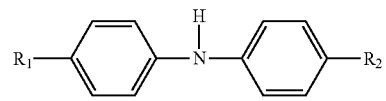

wherein $R_1$ and $R_2$ each, independently of the other, can be a hydrogen atom or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom, if substituted, substitutions can be alkyl or phenyl.

Specific examples of suitable hindered amine antioxidants include the following antioxidants commercially available from Crompton; NAUGUARD® 524, NAUGUARD® 76, NAUGUARD® 512, NAUGUARD® 445 where $R_1=R_2=C(CH_3)_2Ph$, NAUGUARD® 635 where $R_1=R_2=-CH(CH_3)Ph$, NAUGUARD® PS-30 where $R_1=C_4$ or $C_8$, $R_2=C_4$ or $C_8$ and the like.

A hindered phenol antioxidant can also be provided. In one embodiment the hindered phenol is present in a relatively high concentration. A high concentration of hindered phenol antioxidant maximizes long term thermal stability by delaying the onset of the oxidation itself. The hindered phenol antioxidant is present in the ink in any desired or effective amount, in one embodiment of at least about 0.01% by weight of the ink carrier, in another embodiment of at least about 0.5% by weight of the ink carrier, and in yet another embodiment of at least about 1.5% by weight of the ink carrier, and in one embodiment equal to or less than about 4.0% by weight of the ink carrier, in another embodiment equal to or less than about 3.0% by weight of the ink carrier, and in yet another embodiment equal to or less than about 2.5% by weight of the ink carrier, although the amount can be outside of these ranges. Specific examples of suitable hindered phenol antioxidants include ETHANOX® 330, ETHANOX® 310, ETHANOX® 314, ETHANOX® 376 (commercially available from Albemarle) and the like. Also commercially available from Ciba Specialty Chemicals are IRGANOX® 1010, IRGANOX® 1035, IRGANOX®1076, IRGANOX® 1330 and the like. Mixtures of two or more of these hindered phenol antioxidants can also be employed.

A dispersant can optionally be present in the ink in any desired or effective amount for purposes of dispersing and stabilizing the nanodiamond colorant or alternative particles present in the ink vehicle. The dispersant is present in any desired or effective amount, in one embodiment of at least about $1\times10^{-5}\%$ by weight of the ink carrier, in another embodiment of at least about $1\times10^{-3}\%$ by weight of the ink carrier, and in yet another embodiment of at least about $5\times10^{-1}\%$ by weight of the ink carrier, and in one embodiment equal to or less than about 30% by weight of the ink carrier, in another embodiment equal to or less than about 20% by weight of the ink carrier, and in yet another embodiment equal to or less than about 10% by weight of the ink carrier, although the amount can be outside of these ranges. Specific examples of suitable dispersants are polyester dispersants such as those disclosed in U.S. Pat. No. 6,702,884, U.S. Pat. No. 6,841,590, the disclosures of which are totally incorporated herein by reference. Dispersants can include but are not limited to Solsperse® 16000, Solsperse® 28000, Solsperse® 32500, Solsperse® 38500, Solsperse® 39000, Solsperse® 54000, Solsperse® 17000, Solsperse® 17940 from Noveon, Inc. as well as mixtures thereof. Examples of suitable polyester dispersants are disclosed in U.S. Pat. No. 3,996,059 the disclosure of which is totally incorporated herein by reference. Where the dispersant is a polyester of the formula

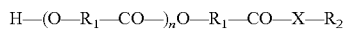

wherein each $R_1$ is an alkylene group, including linear, branched, saturated, unsaturated, cyclic, substituted, and unsubstituted alkyl groups containing at least 8 carbon atoms, such as from about 8 to about 40 carbon atoms or from about 8 to about 30 or from about 8 to about 20 carbon atoms, although the numbers can be outside these ranges, if substituted, substitutions can be (but are not limited to) halogen atoms, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, mixtures thereof, and the like, wherein two or more substituents can be joined together to form a ring;

X is (i) an oxygen atom, (ii) an alkylene group which is attached to the carbonyl group through an oxygen or nitrogen atom with at least 2 carbon atoms; $R_2$ is (i) a hydrogen atom, (ii) a primary, secondary or tertiary amine group or a salt thereof with an acid, or a quaternary ammonium salt group; and n is an integer representing a number of repeating groups, for example from 2 to about 20 or from about 2 to about 10.

Other dispersants may include but are not limited to Solsperse® 13240, Solsperse® 13940 from Noveon, Inc., as well as mixtures thereof.

Another class of suitable dispersants include urethane derivatives of oxidized synthetic or petroleum waxes, such as those available from Baker Petrolite and of the general formulas

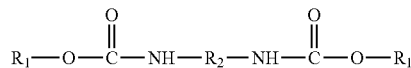

wherein $R_1$ is an alkyl group of the formula $CH_3(CH_2)_n$, n is an integer of from about 5 to about 200, for example from about 10 to about 150 or from about 10 to about 100 and $R_2$ is an arylene group, may also be used as the ink vehicle. These materials may have a melting point of from about 60° C. to about 120° C., such as from about 70° C. to about 100° C. or from about 70° C. to about 90° C. Commercial examples of such materials include, for example, Baker Petrolite CA-11 (Mn=790, Mw/Mn=2.2), Petrolite WB-5 (Mn=650, Mw/Mn=1.7), Petrolite WB-17 (Mn=730, Mw/Mn=1.8), and the like.

Other examples of suitable dispersants are polyalkylene succinimide dispersants such as those disclosed in U.S. Pat. No. 6,858,070, the disclosure of which is totally incorporated herein by reference. Dispersants can include the Chevron Oronite OLOA® 11000, OLOA® 11001, OLOA® 11002, OLOA® 11005, OLOA® 371, OLOA® 375, OLOA® 411, OLOA® 4500, OLOA® 4600, OLOA® 8800, OLOA® 8900, OLOA® 9000, OLOA® 9200 and the like, commercially available from Chevron Oronite Company LLC, Houston, Tex., as well as mixtures thereof. Examples of suitable polyalkylene succinimides and their precursors and methods of making them are disclosed in, for example, U.S. Pat. No. 3,172,892, U.S. Pat. No. 3,202,678, U.S. Pat. No. 3,280,034, U.S. Pat. No. 3,442,808, U.S. Pat. No. 3,361,673, U.S. Pat. No. 3,172,892, U.S. Pat. No. 3,912,764, U.S. Pat. No. 5,286,799, U.S. Pat. No. 5,319,030, U.S. Pat. No. 3,219,666, U.S. Pat. No. 3,381,022, U.S. Pat. No. 4,234,435, and European Patent Publication 0 776 963, the disclosures of each of which are totally incorporated herein by reference.

A rosin ester resin, mixtures thereof, or the like can also be included in the ink carrier. The rosin ester resin is present in the ink carrier in any desired or effective amount, in one embodiment of at least about 0.5% by weight of the ink carrier, in another embodiment of at least about 2% by weight of the ink carrier, and in yet another embodiment of at least about 3% by weight of the ink carrier, and in one embodiment of equal to or less than about 20% by weight of the ink carrier, in another embodiment equal to or less than about 15% by weight of the ink carrier, and in yet another embodiment equal to or less than about 10% by weight of the ink carrier, although the amount can be outside of these ranges. Examples of suitable rosin ester resins include PINECRYSTAL® KE-100 (commercially available from Arakawa), and the like.

In embodiments, additives for aqueous inks herein can include polymeric additives to enhance the viscosity of the ink, and can be added in an amount such as from about 0.001 to about 10 weight percent, or from about 0.001 to about 8 percent by weight, or from about 0.01 to about 5 percent by weight, although the amount can be outside these ranges. Suitable polymeric additives include, but are not limited to, for example, water soluble polymers such as Gum Arabic, polyacrylate salts, polymethacrylate salts, polyvinyl alcohols, hydroxyl propylcellulose, hydroxyethylcellulose, polyvinylpyrrolidinone, polyvinyl ether, starch, polysaccharides, polyethylene imines derivatized with polyethylene oxide and polypropylene oxide, and the like. Other optional ink additives can be selected in embodiments such as biocides, penetration control additives, pH controlling agents, penetrants, surfactants, as known in the art.

The ink carrier can be present in the phase change or aqueous ink prepared in any desired or effective amount, in one embodiment in an amount of at least about 50% by weight of the ink, in another embodiment of at least about 70% by weight of the ink, and in yet another embodiment of at least about 90% by weight of the ink, and in one embodiment equal to or less than about 99% by weight of the ink, in another embodiment equal to or less than about 98% by weight of the ink, and in yet another embodiment equal to or less than about 95% by weight of the ink, although the amount can be outside of these ranges.

In one specific embodiment, the phase change ink carrier has a melting point of less than about 110° C., and in another embodiment of less than about 100° C., although the melting point of the ink carrier can be outside of these ranges.

The phase change ink compositions disclosed herein in one embodiment have melting points in one embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The phase change ink compositions prepared by the process disclosed herein generally have melt viscosities, at the jetting temperature which can be equal to or less than about 145° C., in one embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 cps, in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

The ink compositions can be prepared by any desired or suitable method. For example, the ink carrier components can be mixed together, the nanodiamond colorant and additional optional colorant if present added, followed by, for example, ball milling, and optionally heating. For aqueous inks herein, the ink ingredients can be mixed together with stirring, an optionally filtering, to obtain an aqueous ink. For phase change inks herein, for example, the ink ingredients can be mixed together, followed by heating, to a temperature in one embodiment of at least bout 100° C., and in one embodiment of no more than about 140° C., although the temperature can be outside of these ranges, and stirring until a homogenous ink composition is obtained, followed by cooling the ink to ambient temperature (typically from about 20 to about 25° C.). The phase change inks are solid at ambient temperature. In a specific embodiment, during the formation process, the inks in their molten state are poured into molds and then allowed to cool and solidify to form ink sticks.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Yet another embodiment is directed to a method which comprises (a) incorporating into an ink jet printing apparatus an aqueous ink comprising an aqueous liquid vehicle and a colorant comprising nanodiamond black; (b) causing droplets of the ink to be ejected in an imagewise pattern onto a substrate.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

A phase change ink is prepared as following: Twenty-one grams of SANTICIZER® 278 (a phthalate ester plasticizer available from Monsanto Polymer Products Co., St Louis, Mo.) and 117 grams of molten KEMAMIDE® S-180 (a stearyl stearamide available from Witco Chemical Co., Memphis, Tenn.), and 0.54 gram of NAUGARD® 445 (an antioxidant available from Uniroyal Chemical Co., Middlebury, Conn.) are added (in that order) to a pre-heated 110° C. stainless steel container. The components are then mixed with a propeller mixer, and 71 grams of KE-100 (a glycol ester of hydrogenated abietic acid available from Arakawa Chemical Industrials Inc., Osaka, Japan) are slowly added to the mixture over 20 minutes, maintaining a mixture temperature of at least 100° C. Sixty grams of UNIREZ® 2970 (a dimer acid-based tetra-amide available from Union Camp Corp., Wayne, N.J.) are then added to the mixture over 15 minutes, while also maintaining a minimum mixture temperature of 100° C. The blend is allowed to mix for 1 hour until all the tetra-amide has dissolved. Fifty grams of NB50 (a nanodiamond black by NANOBLOX® Inc., Boca Raton, Fla.) are added into the ink base blend, and mixed with strong agitation or with the aid of ultrasonication for 1 hour. The black ink is then passed through a 2.0 micron filter (Pall Filter P/N PFY1U2-20ZJ, S/N 416) under approximately 5 psi of nitrogen pressure.

Example 2

An aqueous ink is prepared as follows: Forty grams of distilled water are mixed with 30 grams of sulfolane and 8 grams of 2-pyrrolidinone for 30 minutes. Twenty grams of NB50 (a nanodiamond black available from NANOBLOX® Inc., Boca Raton, Fla.) are added into the mixture, and mixed with strong agitation with the aid of ultrasonication for 10 minutes. The black ink is then filtered through a 2.0 micron filter (Pall Filter P/N PFY1U2-20ZJ, S/N 416) under approximately 5 psi of nitrogen pressure.

Example 3

A phase change ink is prepared by repeating the process of Example 1 except that a hydroxyl modified nanodiamond black (NB50-OH available from NANOBLOX® Inc.) is incorporated to replace the unmodified nanodiamond black NB50.

Example 4

An aqueous ink is prepared by repeating the process of Example 2 except that a quaternized amine modified nanodiamond black (NB50-quaternized amine available from NANOBLOX® Inc.) is incorporated to replace the unmodified nanodiamond black NB50.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. An aqueous ink comprising (a) an aqueous liquid ink carrier (b) a colorant comprising nanodiamond black; and (c) a polymeric additive selected from the group consisting of Gum Arabic, polyacrylate salts, polymethacrylate salts, polyvinyl alcohols, hydroxyl propylcellulose, hydroxyethylcellulose, polyvinylpyrrolidinone, polyvinyl ether, starch, polysaccharides, polyethylene imines derivatized with polyethylene oxide, polyethylene imines derivatized with polypropylene oxide, and mixtures thereof.

2. The ink of claim 1, wherein the nanodiamond black has an average grain size of from about 5 to about 500 nanometers.

3. The ink of claim 1, wherein the nanodiamond black comprises a diamond-like core substantially surrounded by a graphite shell, and wherein the core is present in an amount of from about 10 to about 70 weight percent with respect to the total weight of the core and shell.

4. The ink of claim 1, wherein the nanodiamond black comprises a diamond-like core substantially surrounded by a graphite shell, and wherein the core is present in an amount of about 50 weight percent and wherein the shell is present in an amount of about 50 weight percent, with respect to the total weight of the core and shell.

5. The ink of claim 1, wherein the nanodiamond black has a diamond-like core substantially surrounded by a graphite shell, and wherein the graphite shell is surface modified with at least one functional group.

6. The ink of claim 1, wherein the nanodiamond black has a diamond-like core substantially surrounded by a graphite surface, and wherein the surface is modified with at least one functional group, and wherein the at least one functional group is selected from the group consisting of carboxyl, carbonyl, quinine, ether, alkyl, nitrile, hydroxyl, lactone, amine, quaternized amine, and combinations thereof.

7. The ink of claim 1, wherein the nanodiamond black is present in an amount of from about 0.05% to about 30% by weight of the ink wherein a total weight of the ink is about 100%.

8. The ink of claim 1, wherein the aqueous ink carrier is selected from a member of the group consisting of water, glycols, mixtures of glycols, a mixture of water and a miscible organic component, amides, ethers, carboxylic acids, esters, alcohols, organosulfides, organosulfoxides, sulfones, dimethylsulfoxide, sulfolane, alcohol derivatives, carbitol, butyl carbitol, cellosolve, ether derivatives, amino alcohols, ketones, and mixtures thereof.

9. The ink of claim 1, further comprising a dispersant.

10. The ink of claim 1, further comprising a carbon black.

11. The ink of claim 1, further comprising an additive selected from the group consisting of biocides, penetration control additives, pH controlling agents, penetrants, surfactants, and mixtures thereof.

12. A process which comprises (a) incorporating into an ink jet printing apparatus an aqueous ink comprising an aqueous liquid vehicle, a colorant comprising nanodiamond black; and a polymeric additive selected from the group consisting of Gum Arabic, polyacrylate salts, polymethacrylate salts, polyvinyl alcohols, hydroxyl propylcellulose, hydroxyethylcellulose, polyvinylpyrrolidinone, polyvinyl ether, starch, polysaccharides, polyethylene imines derivatized with polyethylene oxide, polyethylene imines derivatized with polypropylene oxide, and mixtures thereof; and (b) causing droplets of the ink to be ejected in an imagewise pattern onto a substrate.

13. The process of claim 12, wherein the printing apparatus employs a piezoelectric printing process wherein droplets of the ink are caused to be ejected in an imagewise pattern by oscillations of piezoelectric vibrating elements.

14. The process according to claim 12, wherein the substrate is a final recording sheet and droplets of the ink are ejected in an imagewise pattern directly onto the final recording sheet.

15. The process of claim 12, wherein the nanodiamond black has an average grain size of from about 5 to about 500 nanometers.

16. The process of claim 12, wherein the nanodiamond black comprises a diamond-like core substantially surrounded by a graphite shell, and wherein the core is present in an amount of from about 10 to about 70 weight percent with respect to the total weight of the core and shell.

17. The process of claim 12, wherein the nanodiamond black has a diamond-like core substantially surrounded by a graphite shell, and wherein the graphite shell is surface modified with at least one functional group.

18. The process of claim 12, wherein the aqueous ink carrier is selected from a member of the group consisting of water, glycols, mixtures of glycols, a mixture of water and a miscible organic component, amides, ethers, carboxylic acids, esters, alcohols, organosulfides, organosulfoxides, sulfones, dimethylsulfoxide, sulfolane, alcohol derivatives, carbitol, butyl carbitol, cellosolve, ether derivatives, amino alcohols, ketones, and mixtures thereof.

\* \* \* \* \*